United States Patent
Slimáček et al.

(10) Patent No.: US 12,548,050 B2
(45) Date of Patent: Feb. 10, 2026

(54) TRANSACTION VERIFICATION IN ONLINE CONSUMER REVIEWS

(71) Applicant: Gen Digital Inc., Tempe, AZ (US)

(72) Inventors: Václav Slimáček, Prague (CZ); Kevin Roundy, El Segundo, CA (US)

(73) Assignee: Gen Digital Inc., Tempe, AZ (US)

( * ) Notice: Subject to any disclaimer, the term of this patent is extended or adjusted under 35 U.S.C. 154(b) by 155 days.

(21) Appl. No.: 18/494,453

(22) Filed: Oct. 25, 2023

(65) Prior Publication Data

US 2025/0139672 A1    May 1, 2025

(51) Int. Cl.
*G06Q 30/0282* (2023.01)
*G06F 21/32* (2013.01)

(52) U.S. Cl.
CPC ......... *G06Q 30/0282* (2013.01); *G06F 21/32* (2013.01)

(58) Field of Classification Search
CPC ............................ G06Q 30/0282; G06F 21/32
USPC ......................................................... 705/347
See application file for complete search history.

(56) References Cited

U.S. PATENT DOCUMENTS

| | | | | |
|---|---|---|---|---|
| 10,007,936 | B1 * | 6/2018 | Ghoshal | G06Q 50/01 |
| 2014/0279616 | A1 * | 9/2014 | Aoki | G06Q 50/01 |
| | | | | 705/319 |
| 2015/0059003 | A1 * | 2/2015 | Bouse | G06F 16/2379 |
| | | | | 726/28 |
| 2018/0308100 | A1 * | 10/2018 | Haukioja | G06N 20/00 |
| 2020/0219152 | A1 * | 7/2020 | Belle | G06Q 20/209 |
| 2021/0365968 | A1 * | 11/2021 | Narula | G06Q 20/341 |
| 2024/0232959 | A1 * | 7/2024 | Vesentini | G06Q 20/401 |

OTHER PUBLICATIONS

•"Consumer Alert: Division of Consumer Protection Urges New Yorkers to be Aware of Brushing Scams", New York State Department of State, Feb. 28, 2022, 6 pages (Year: 2022).*
"Why Picking the Right Master Record is Critical in CRM Deduplication", Mar. 14, 2021, 23 pages (Year: 2021).*

* cited by examiner

*Primary Examiner* — James D Nigh
(74) *Attorney, Agent, or Firm* — AVEK IP, LLC; Mark C. Young

(57) ABSTRACT

A QR code on a receipt or invoice for a transaction facilitates a verified review for the transaction. The QR code or similar code contains information regarding the transaction and is printed on a review or invoice, such that a user wishing to write a review can scan the printed code such as with a camera and an app on a smartphone. The printed QR code comprises an encoded reference to a purchase and allows the user to employ the app (and/or a network-based service supporting the review app) to verify that a review has not yet been published for the purchase, and to compose a verified review for the purchase. The user may further select one or more review sites on which to publish the verified review, such as Google, Yelp, TripAdvisor, and the like, and publish the verified review on the selected review sites.

19 Claims, 4 Drawing Sheets

TRANSACTION VERIFICATION IN ONLINE CONSUMER REVIEWS

FIELD

The present invention relates generally to online consumer reviews of goods and services, and more specifically to automated transaction verification in online consumer reviews.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to use computers in unintended or undesirable ways. Hackers may communicate with other users' computers in a manner that poses a danger to the other users, such as attempting to log in to a corporate computer to steal, delete, or change information. Computer viruses or Trojan horse programs may be distributed to other computers or unknowingly downloaded such as through email, download links, or smartphone apps. Further, hackers may attempt to disrupt e-commerce, which is a trillion dollar per year industry in the United States alone, such as by redirecting purchases, intercepting payments or goods, or the like.

Online purchases may be strongly influenced by reviews others have posted for the same product or service, such as a shopper reading speaker reviews on an e-commerce site to determine which of several speakers sounds the best, is easiest to use, or is least prone to breaking. Such reviews can be a valuable resource for online shoppers who have never visited a restaurant of interest, have no personal knowledge or history of a service company to repair a broken appliance, or can't hold an e-commerce website product in their hands before a purchase. A positive review's text can provide useful information about a product that a potential purchaser might not otherwise be able to ascertain, and a significant number of positive reviews can give a customer peace of mind that their purchase decision is sound.

But, because positive reviews play such an important role in e-commerce, fake online reviews have become commonplace and on occasion outnumber actual legitimate reviews on some sites. Online retailers like Amazon and eBay are careful to allow only verified and legitimate purchasers of items to leave reviews for those items, but even site such as these often contain fake reviews posted as a result of heavily discounted bulk transactions or for completely different products that are later substituted in place of the original reviewed product but benefit from its positive reviews.

Fake negative reviews can be just as troublesome, as competitors or others with ulterior motives may post several negative reviews for a company, product, or service to drive e-commerce traffic away from their competition for reasons unrelated to an actual review of a product or service. Markets now exist for a person to buy positive or negative reviews for a relatively low price, and review "farms" such as automated botnets or low-paid laborers enter the type of review purchased for the targeted item or service. Reliable reviews for offline purchases, such as meals in restaurants, service calls from home service providers, or personal services such as doctor visits or a haircut can make verification of a legitimate purchase difficult and remain particularly subject to receiving multiple reviews from illegitimate reviewers.

For reasons such as these, a need exists for verification of online user reviews of goods and services.

SUMMARY

One example embodiment comprises using a QR code on a receipt or invoice for the transaction to facilitate a verified review for the transaction. In a more detailed example, a QR code or similar code containing information regarding the transaction is printed on a review or invoice, such that a user wishing to write a review can scan the printed code such as with a camera and an app on a smartphone. In a further example, the printed code comprises an encoded reference to a purchase, and allows the user to employ the app (and/or a network-based service supporting the review app) to verify that a review has not yet been published for the purchase, and to compose a verified review for the purchase. The user may further select one or more review sites on which to publish the verified review, such as Google, Yelp, TripAdvisor, and the like, and publish the verified review on the selected review sites.

In further example, the QR code or other code comprises one or more of an order ID number, an identity of goods and/or services purchased, and links to one or more review sites for the seller of the purchase. In some examples, the app or another computerized system is further operable to ensure that the user account on the app is unique before publishing the review. The review in some examples may be anonymous yet verified, such as where the user does not wish to have their true identity associated with the review but the review has been verified as associated with a legitimate transaction via the QR code or other code.

The details of one or more examples are set forth in the accompanying drawings and the description below. Other features and advantages will be apparent from the description and drawings, and from the claims.

DETAILED DESCRIPTION

Figure 1:
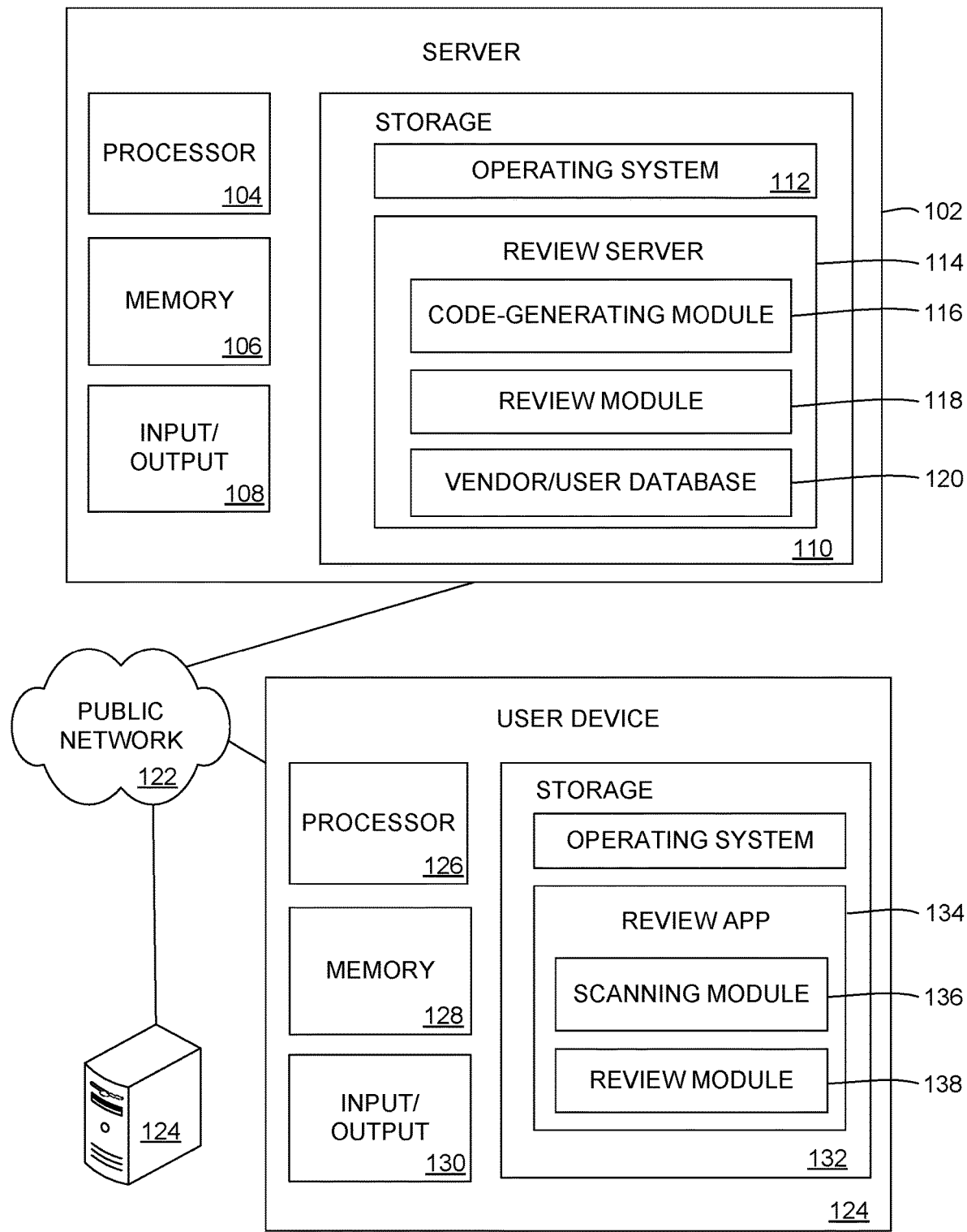
FIG. 1 is a block diagram of a computing environment including a client and server operable to facilitate verified reviews for offline transactions, consistent with an example embodiment.

In the following detailed description of example embodiments, reference is made to specific example embodiments by way of drawings and illustrations. These examples are described in sufficient detail to enable those skilled in the art to practice what is described and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they convey has grown exponentially. Computers are now used to perform many tasks that were previously performed manually, such as online shopping instead of driving to a store or mall to purchase goods or services, using social media instead of telephone or other means to keep in touch with friends and relatives, and online news sites that continue to replace newspapers and news broadcasts as a source of timely new information. Online shopping in particular continues to grow rapidly, now exceeding five trillion dollars a year in online purchases worldwide. But, with the tremendous value of online sales there is great competition to capture sales from other vendors and maximize profit per transaction, such as through advertising, search engine optimization, and other means.

Online reviews from other customers play a significant role in building reputation and trust for online merchants, products being sold, and service providers. Premier websites like eBay use online reviews of past transactions to build the reputation of buyers and sellers, reassuring participants that other users have reliably performed their end of a transaction such as by paying for an auction item won or by promptly sending well-packaged merchandise matching the description in an auction listing upon completion of an auction. Reviews for products for sale on online merchants such as Amazon similarly can help customers decide between a plethora of options and may include both simple reviews such as a number of stars ranging from one to five and more complex reviews such as a written paragraph describing the consumer's review of the purchased goods.

Consumers' reliance on online reviews to choose goods and services makes reviews a target for malicious users to illegitimately influence sales. Fake negative reviews can drive business away from a competitor, and fake positive reviews can give a product or service an unfair competitive advantage in a crowded market. Various services exist through which a malicious user can purchase a number of fake reviews for a product or service, potentially overwhelming the legitimate reviews left for the same product or service or making a new product or service appear to be a reputable and established offering.

Some online review sites therefore restrict reviews to verified purchases, allowing a party to a transaction to leave a single review for the goods, services, and/or vendors involved in the transaction. Verified purchases in such examples typically only include purchases from the site on which the review is being made, so that the site can verify that a past purchase is associated with the review. Other sites differentiate between verified and unverified reviews, indicating which reviews are from verified purchasers and which reviews may be suspect.

But, some products and services such as restaurants, haircuts, and doctor visits do not lend themselves well to reviews that are verified using methods such as these, as the transaction is typically completed offline. Further, reviews for many such goods and services are not found on the merchant's own site, but on a third-party review site such as Yelp, TripAdvisor, and Healthgrades that are not able to verify a transaction associated with a review.

Some examples presented herein therefore provide for verified reviews for offline transactions, such as by using a QR code on a receipt or invoice for the transaction to enable a verified review. In a more detailed example, a QR code or similar code containing information regarding the transaction is printed on a review or invoice, such that a user wishing to write a review can scan the printed code such as with a camera and an app on a smartphone. In a further example, the printed code comprises an encoded reference to a purchase, and allows the user to employ the app (and/or a network-based service supporting the review app) to verify that a review has not yet been published for the purchase, and to compose a verified review for the purchase. The user may further select one or more review sites on which to publish the verified review, such as Google, Yelp, TripAdvisor, and the like, and publish the verified review on the selected review sites.

In a more detailed example, the QR code or other code comprises one or more of an order ID number, an identity of goods and/or services purchased, and links to one or more review sites for the seller of the purchase. In some examples, the app or another computerized system is further operable to ensure that the user account on the app is unique before publishing the review. The review in some examples may be anonymous yet verified, such as where the user does not wish to have their true identity associated with the review, but the review has been verified as associated with a legitimate transaction via the QR code or other code.

FIG. 1 is a block diagram of a computing environment including a client and server operable to facilitate verified reviews for offline transactions, consistent with an example embodiment. Here, the server 102 includes a processor 104 operable to execute computer program instructions and a memory 106 operable to store information such as program instructions and other data while server 102 is operating. The server exchanges electronic data, receives input from a user, and performs other such input/output operations with input/output 108. Storage 110 stores program instructions including an operating system 112 that provides an interface between software or programs available for execution and the hardware of the server and manages other functions such as access to input/output devices. The storage 110 also stores program instructions and other data for a review server 114, including code-generating module 116, review module 118, vendor/user database 120. In this example, the computerized device is also coupled via a public network 122 to one or more user devices 124, such as a user's smartphone or other remote client computerized device.

In operation, a server 102 operates a review server software 114 that performs a variety of functions to facilitate verified reviews of offline purchases. The review server software comprises a code-generating module 116 that is operable to generate QR codes or similar printable codes for a participating merchant's transaction. In a more detailed example, a merchant 124 wishing to have verified reviews for offline purchases shares a secure key such as an encryption key with the server 102's review server 114, such that the code-generating module can use the secure key to encode a record of merchant 124's transactions in QR codes and print the codes relating to the transactions on receipts or invoices for the transactions. In an alternate embodiment, the QR code or other printable code is generated on the merchant 124's system using the shared secure key such that the review server 114 is operable to decrypt and read the printable code. Use of a shared secure key ensures that malicious users cannot create verified review QR codes for the merchant 124, and that reviews created using the QR code are valid and unique.

The QR or other printable code comprises in various examples information such as a transaction ID, information about the product or service purchased such as the type of good or service purchased, identities or links to one or more preferred review sites, the identity of the merchant, and/or other such information regarding the transaction. In one such example, a QR code identifying the goods or services purchased and the date of purchase is printed on a customer's receipt by merchant 124. When the code is scanned on user device 124 using the review app 134's scanning module 136, such as via a smartphone's camera, the scanning module decrypts the QR code (or sends the QR code to server 102 for decryption and/or verification) and reads the information such as a transaction ID or identification of the goods or services purchased embedded in the QR code. In a further example, the QR code contains a unique order ID or transaction number, ensuring that multiple reviews cannot be left for the same transaction using the QR code.

Once the transaction and the relevant goods or services are identified using the QR code in review app 134, a user may compose a review using review module 138 for the relevant goods or services. The review module in a further example receives the identity of one or more review sites or services identified in the QR code to which the vendor wishes reviews to be posted, such as Google, TripAdvisor, Yelp, or other such sites or services. In a further example, the user has the option of choosing from one or more sites to which the review will be posted, such as by checking a box next to various review sites and services presented as options by the review module 138.

Once the user has composed a review, selected the appropriate sites or services to which to submit the review, and submitted the review, the review is sent to the one or more sites to be posted. In a more detailed example, the review app 134 may store the user's login credentials to the one or more review sites and uses these credentials to log in and post the verified review. If the user does not have a login for a site or service to which the review is to be posted, the review app 134 may automatically create a login for the user and/or the review app to post the review, and store the created login credentials. The created login credentials may be associated with the user's identity, or in another example may be an anonymous account created and managed by the review app 134. In an alternate example, the review app 134 identifies itself as a trusted review app to at least one of the one or more sites or services, such as using a shared encryption key or other cryptographic function, and posts the verified review.

In a more detailed example, the review app 134 allows only one login per review site, and verifies the identity of the user such as based on the user's device, phone number, biometrics, or other means. This ensures that a user can be uniquely identified by the review app 134 and by their interactions with review sites via the app, limiting the ability of a malicious merchant 124 to use the verified offline review system of FIG. 1 to post several different reviews to review sites using the system. In a further example, biometrics such as face ID or fingerprint are used to uniquely identify the user to the review app 134, such that a user may be prevented from creating multiple review accounts on different smartphones or other devices running different instances of the review app 134. Other strange behavior of a user may similarly be identified, such as attempting to leave only negative reviews for businesses in a certain area or line of business, enabling the review server 102 or review app 134 to better identify potentially malicious or illegitimate reviews.

The QR codes printed on receipts or invoices are in some examples standard QR codes, which are two-dimensional codes resembling bar codes but comprising a grid of black and white squares rather than bars that are easily readable by optical scanners, smartphone cameras, and other common equipment. Although QR codes are used in many examples presented herein, other codes such as UPC barcodes, DotCode, MaxiCode, and other matrix codes may similarly be used in other examples. In a more detailed example, the QR code comprises a Secure QR or SQR code that contains a "private data" segment that can only be read with a decryption key, such as a key shared between the user device's review app 134 and the server 102's code-generating module or merchant 124's receipt or invoice printing software.

The examples discussed in conjunction with FIG. 1 demonstrate how verified reviews can be created for offline transactions such as restaurant meals or doctor's visits, using a machine-readable code printed on a receipt or invoice. By scanning a code such as a QR code on the transaction receipt that is unique to the transaction, the customer is able to leave a verified review for the transaction's goods, services, and/or seller at one or more review sites, such as by using a review app on a smartphone or other computerized device.

Figure 2:
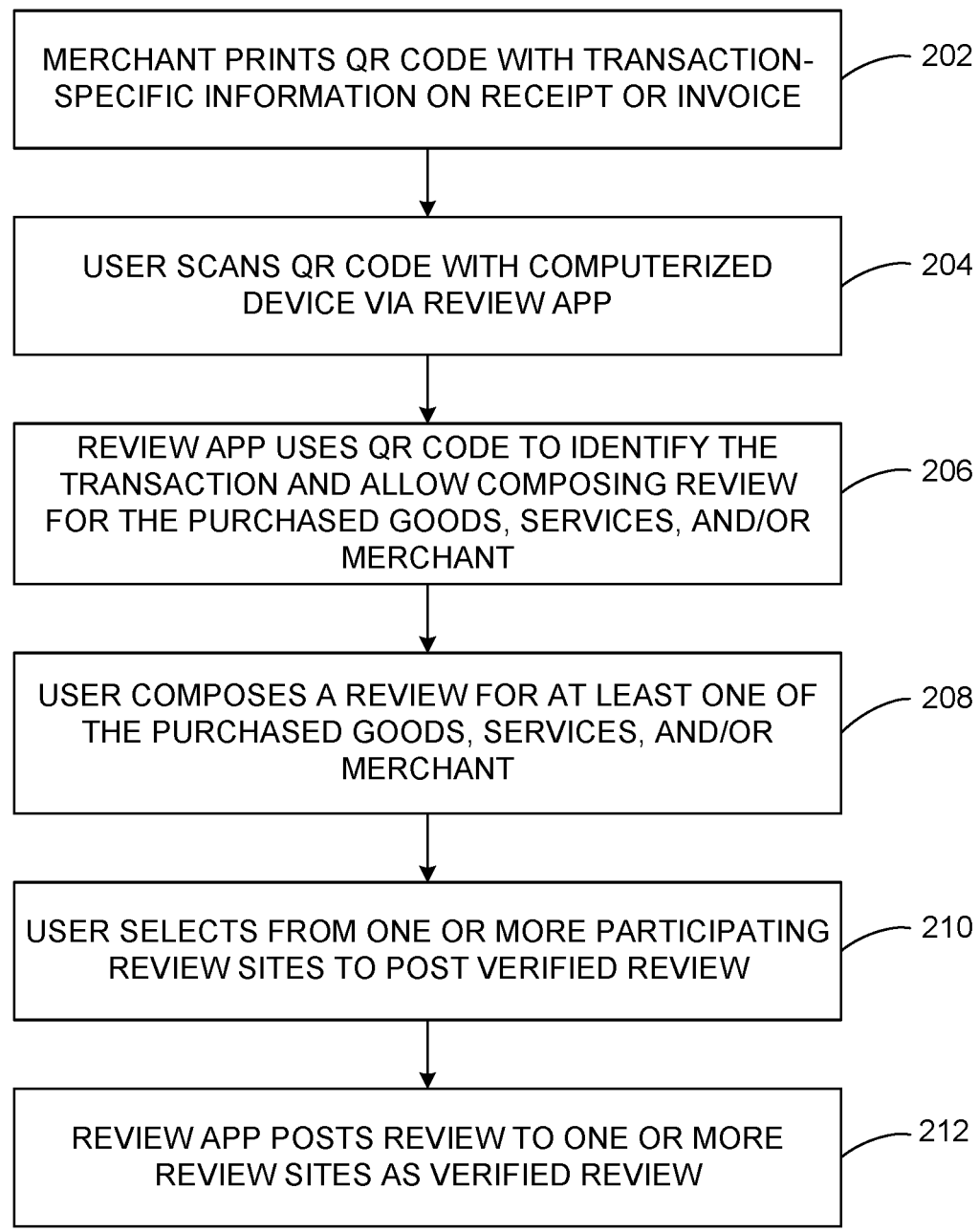
FIG. 2 is a flow diagram of a method of leaving a verified review for a transaction, consistent with an example embodiment.

FIG. 2 is a flow diagram of a method of leaving a verified review for a transaction, consistent with an example embodiment. The flow diagram of FIG. 2 is from the perspective of an end user, or an end user's computerized device. At 202, a merchant prints a QR code or other machine-readable code such as a two-dimensional printed code on a receipt, invoice, or other document associated with the transaction. The QR code comprises information that identifies the goods, services, and/or merchant involved in the transaction, and in a further example uniquely identifies the transaction. In some examples, additional information such as web links or other identification of one or more review sites the merchant wishes to promote for customer reviews is embedded in the QR code.

The user scans the QR code at 204, such as by using a camera on a smartphone while running a review app. The review app reads the data embedded in the QR code, which in a further example may be encrypted or encoded, such as by a private cryptographic key employed by code-generating module 116 of server 102 as shown in FIG. 1, to ensure the authenticity and integrity of the generated QR codes. The review app uses the identifying information in the QR code to determine what goods and/or services were purchased from what merchant at 206, so that a review of the goods, services, and/or merchant can be verified as authentic and based on an actual transaction. In a more detailed example, the QR code may include a record of the goods and/or services purchased as well as a merchant identifier, while other examples may include a transaction identification code which can be looked up in a database such as database 120 of FIG. 1 to determine the goods, services, and/or merchant involved with the transaction.

In a further example, the review app may also determine whether the scanned QR code has already been used to generate a review, such as by querying a database 120 on a remote server to determine past usage of the QR code to create a verified review, ensuring that a single unique QR code can only be used one time. In a more detailed example, the review app authenticates the identity of the user, such as using biometric identification such as a face scan or fingerprint, to enable the user to scan a code and create a verified review. This ensures that each user of the review app is unique, and that a single user does not have multiple accounts under which fake or multiple verified reviews can be posted. For example, an owner of a business could not write several verified reviews for his own establishment using the review app, as he is limited to having a single account based on his biometric identity and each user is allowed to have only one active verified review a merchant, product, or service.

At 208, the user composes a review for the goods, services, and/or merchants identified via the QR code, such as by entering text, dictating text, adding one or more photos, and the like. When the review is composed, the user selects from one or more available review sites to post a verified review at 210. The one or more available review sites may comprise a list of review sites supported by the app, suggested by the merchant such as by embedding in the QR code or associating with the transaction, or chosen through another means. For example, some review sites may wish to partner with the app vendor and "flag" or "badge" reviews received via the trusted review app as verified. Other sites may wish to allow anonymous reviews via the app as long as the reviews are verified, such as by receiving the reviews from the trusted review app.

The verified review is then posted to the one or more review sites as a verified review at 212. In a further example, the review site is aware that the review is being posted via a trusted review app that is capable of providing verified reviews for offline purchases, and either automatically flags the review as a verified review or allows the trusted app to designate a posted review as a trusted review.

The review app may post the review to one or more review sites by logging in to the review site using a user-specific login, such as one provided by the user and retained in the review app for future review postings. In a further example, if the user does not have a login for a selected review site the review app with automatically create and store a login for the user using the user's known or stored information (such as email address, name, location, etc.). In some examples, a user login created via the review app may be designated a verified user such that the user's identity is known to be real. In a further example, some user logins created and used exclusively by the review app (e.g., where the password is not openly presented to the user) may allow characterization of reviews posted via the exclusive login as verified reviews, given that the only reviews posted using the login credentials will be verified reviews posted via the trusted review app.

Figure 3:
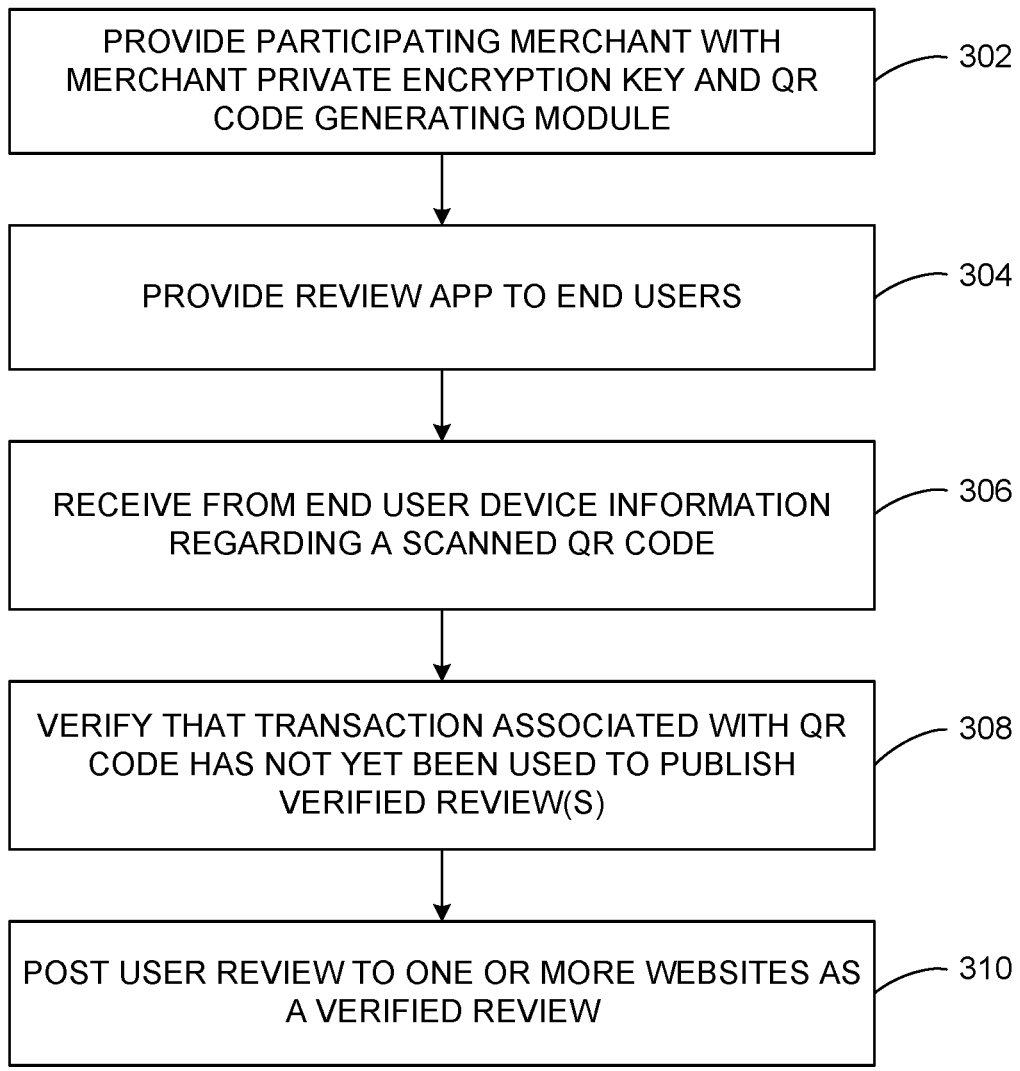
FIG. 3 is a flow diagram of a method of posting verified reviews for offline purchases from the perspective of a review app service provider, consistent with an example embodiment.

FIG. 3 is a flow diagram of a method of posting verified reviews for offline purchases from the perspective of a review app service provider, consistent with an example embodiment. At 302, a verified review service provider creates a public key and a private key for a new participating merchant, and sends the merchant a QR code generating module with the merchant's private key embedded in the software. The merchant's software may be operable to use the private key to embed encrypted data in a QR code, such as items or services in a transaction, a transaction ID, or other such information. The service provider also provides a review app to end users at 304 (such as through Apple and Android app stores) that a user may use to scan the QR code, compose a review, and perform other such functions.

Once the merchant has used their private encryption key and QR code generating module to generate a QR code with transaction information on a customer's receipt or invoice, the customer is able to scan the QR code with their review app and initiate leaving a verified review. The QR code may be scanned in the app via the smartphone's camera, or in other examples another code such as a two-dimensional matrix code may be scanned using a camera or other means. The QR code in this example contains one or more data elements identifying the transaction, the goods or services sold, the merchant, or other such transaction information. The user in this example is able to compose a review for the identified goods, services, and/or merchant via the review app, including in various examples a rating on a rating scale (such as four out of five stars), a written text review, one or more photographs of the goods or merchant, and the like.

The verified review service provider receives information regarding the scanned QR code at 306, such as a unique transaction ID, and in a further example may authenticate the user's identity. The user's identity may also be verified as unique, such as by using biometric identification such as fingerprints, a face scan, or the like, ensuring that a single user such as a merchant cannot create several review app accounts and leave multiple reviews for either himself or his competitors. The verified review service provider may also verify that the QR code has not already been used to leave a verified review for the transaction at 308. If the QR code has not been used to publish a verified review as determined at 308, the user review is then posted to one or more selected websites as a verified review at 310. In some examples, the verified review service provider may post the review received from the user's review app to the one or more websites, such as using a mechanism that identifies the review to the websites as being a verified review from the verified review service provider. In other examples, the user's review app will allow direct posting from the review app to review sites, such as using the user's stored credentials for the websites, and may further notify the verified review service provider that a review has been posted for the transaction identified in the QR code to prevent repeated use of the QR code to post additional verified reviews.

In some examples, credentials to leave reviews are the user's own personal login credentials to various review sites. Such credentials may be stored in the review app or by the verified review service provider once entered so that the user does not need to re-enter credentials to leave subsequent reviews. If the user does not have login credentials for a selected review site, the review app may automatically create and store credentials for the user, such as by using the user's profile information such as name, nickname, geographic location, and other such information. In other examples, the credentials used to post a verified review are not made visible to the user, but are unique to the review app, the user of the review app, or verified review service provider to facilitate posting reviews that may be automatically recognized as verified reviews. In one more detailed example, the review app creates a verified review account for the user with one or more of the review sites by exchanging a cryptographic key with the review site to verify the authenticity of the review app (either directly or via the verified review service provider's server), and reviews posted using the credentials are presumed to be verified reviews.

The examples presented above demonstrate how use of a user-scannable code such as a QR code on a receipt or invoice for an offline transaction can be used to create a verified review for the transaction. By printing a unique code that can only be used to create one review for a purchase and providing the user-scannable code with the receipt or invoice, the verified review service provider can ensure that only legitimate purchasers leave reviews and that only a single review is left for each good, service, or merchant involved in a transaction. Use of biometric identification or other such methods may ensure that a user has a single review account, and prevent owners or other malicious reviewers from creating several review accounts and leaving many positive reviews for their own offerings.

Figure 4:
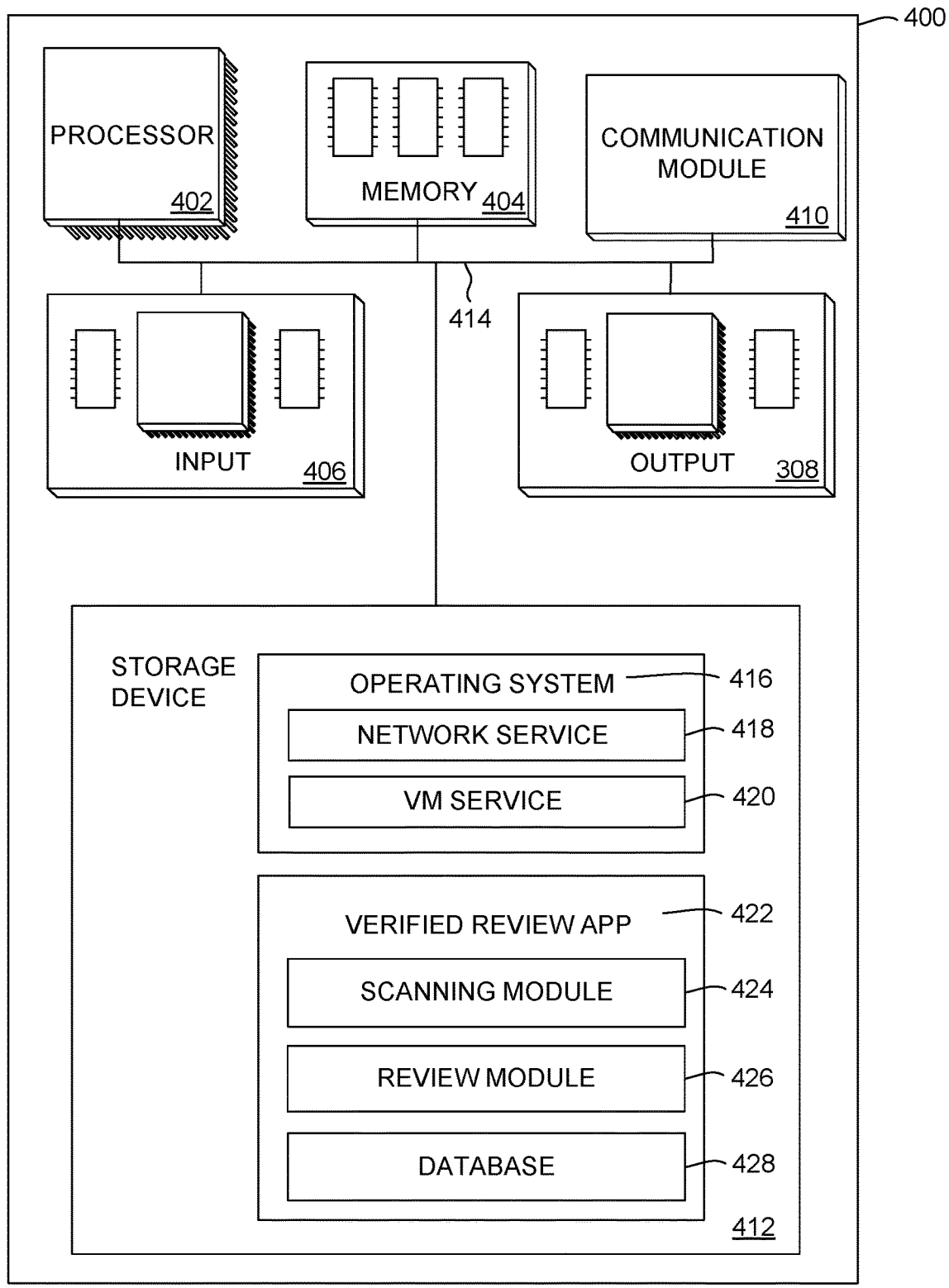
FIG. 4, consistent with an example embodiment.

FIG. 4 is a computerized system employing a verified review app, consistent with an example embodiment. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server. One or more applications, such as verified review app 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as verified review app 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such verified review app 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as verified review app 422 to components of computing device 400. For example, operating system 416, in one example, facilitates the communication of various applications such as verified review app 422 with processors 402, communication unit 410, storage device 412, input device 406, and output device 408. Applications such as verified review app 422 may include program instructions and/or data that are executable by computing device 400. As one example, verified review app 422 uses scanning module 424 to read a QR code associated with a transaction via a camera attached to the computerized device, and uses review module 426 to allow a user to compose and post a review for the transaction identified in the scanned QR code. Database 428 may store information such as user logins to one or more review sites, a record of past reviews, and other such user information relevant to the verified review app 422. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of providing an online review for a purchase comprising:
   scanning, by an app executing on a user device, a printed machine-readable code, the machine-readable code comprising a reference to a purchase and including encrypted transaction data generated using a merchant-specific private encryption key;
   decrypting, by the app or by a remote server supporting the app, the encrypted transaction data to authenticate the code and obtain a transaction identifier and an identity of a merchant;
   verifying, by querying the remote server in real time, that a review corresponding to the purchase identified by the decrypted transaction data has not yet been published;
   authenticating, before publishing, that a user account on the app is unique;
   composing a verified review for the purchase;
   selecting one or more review sites on which to publish the verified review; and
   automatically publishing, by the review app, the verified review on the selected one or more review sites using stored or automatically created credentials and identifying the posted review to the selected review sites as a verified review via cryptographic exchange with the sites.

2. The method of providing an online review for a purchase of claim 1, wherein the printed code is a QR code.

3. The method of providing an online review for a purchase of claim 1, wherein the printed code is printed on a receipt or invoice for the purchase.

4. The method of providing an online review for a purchase of claim 1, wherein scanning the printed code comprises scanning the printed code with a camera on a computerized device.

5. The method of providing an online review for a purchase of claim 1, wherein the encoded reference to a purchase comprises an order ID number.

6. The method of providing an online review for a purchase of claim 1, wherein the encoded reference to a purchase comprises an identity of goods and/or services purchased.

7. The method of providing an online review for a purchase of claim 1, wherein the encoded reference to a purchase comprises links to one or more review sites for the seller of the purchase.

8. The method of providing an online review for a purchase of claim 1, wherein the app comprises a smartphone app, a tablet app, or a web app.

9. The method of providing an online review for a purchase of claim 1, wherein selecting one or more review sites on which to publish the verified review comprises selecting from a list of relevant review sites.

10. The method of providing an online review for a purchase of claim 1, further comprising automatically logging a user on to the selected one or more review sites to publish the review.

11. The method of providing an online review for a purchase of claim 1, further comprising automatically creating a login for the user on at least one of the selected one or more review sites to publish the review if the user does not have an existing login for the at least one of the one or more selected review sites.

12. The method of providing an online review for a purchase of claim 1, further comprising verifying the user account on the app is unique before publishing the review.

13. The method of providing an online review for a purchase of claim 12, wherein verifying the user account on the app is unique before publishing the review comprises verifying the user's identity via biometric verification.

14. The method of providing an online review for a purchase of claim 1, wherein publishing the verified review comprises anonymously publishing the verified review.

15. A computing device, comprising:
   a processor and a nonvolatile storage, the nonvolatile storage comprising coded instructions that when executed on the computing device cause the computing device to:
   scan a printed code via an app, the printed code comprising an encoded reference to a purchase with encrypted transaction data produced using a merchant private encryption key;
   decrypt, by the app or a network service, the printed code to obtain transaction information and verify the authenticity of the printed code;
   verify, by querying a remote server in real time, that the transaction identified by the printed code has not yet been used to publish a verified review;
   authenticate that a user account on the app is unique;
   compose, using input from a user, a verified review for the purchase;
   select, based on input from a user, one or more review sites on which to publish the verified review; and
   automatically publish the verified review on the selected one or more review sites as a verified review via a cryptographic exchange with the sites.

16. The computing device of claim 15, wherein the printed code is a QR code printed on a receipt or invoice for the purchase, and wherein scanning the printed code comprises scanning the printed code with a camera on a computerized device.

17. The computing device of claim 15, wherein the encoded reference to a purchase comprises one or more of an order ID number, an identity of goods and/or services purchased, and links to one or more review sites for the seller of the purchase.

18. The computing device of claim 15, the instructions when executed further operable to cause the computerized system to verify that the user account on the app is unique before publishing the review.

19. The computing device of claim 15, wherein publishing the verified review comprises anonymously publishing the verified review.

* * * * *